United States Patent

Carbonel

[15] 3,650,908

[45] Mar. 21, 1972

[54] METHOD OF MANUFACTURING INTEGRATED MAGNETIC MEMORY ELEMENT

[72] Inventor: Michel Carbonel, Paris, France

[73] Assignee: Thomson-CSF

[22] Filed: Nov. 26, 1969

[21] Appl. No.: 880,022

[30] Foreign Application Priority Data

Dec. 10, 1968 France....................................177379

[52] U.S. Cl.....................................204/15, 204/11, 204/16

[51] Int. Cl.........................................C23b 5/48, C23b 7/00

[58] Field of Search..................................204/15, 11, 12, 16

[56] References Cited

UNITED STATES PATENTS

| | | | |
|---|---|---|---|
| 3,192,136 | 6/1965 | Reid | 204/11 |
| 3,317,408 | 5/1967 | Barnes et al. | 204/15 |
| 3,325,379 | 6/1967 | Bussolini et al. | 204/12 |
| 3,436,814 | 4/1969 | Fuller et al. | 204/15 |
| 3,457,634 | 7/1969 | Root | 204/15 |
| 3,520,782 | 7/1970 | Carbonel | 204/15 |

*Primary Examiner*—John H. Mack
*Assistant Examiner*—Thomas Tufariello
*Attorney*—Kurt Kelman

[57] ABSTRACT

In a method of manufacturing integrated magnetic memory elements the steps of: deposition by electrolysis on one face of a substrate made of a metal easily removed by etching agents through a mask, of the magnetic circuit; forming apertures through the substrate, inside the circuit, by etching through a second mask placed over the other face of the substrate; deposition by electrolysis of a further layer of metal on the assembly and in the apertures; depositing the conductor by electrolysis on the two faces of the assembly and in the apertures.

1 Claims, 5 Drawing Figures

PATENTED MAR 21 1972

3,650,908

INVENTOR
MICHEL CARBONEL
By [signature]
AGENT

METHOD OF MANUFACTURING INTEGRATED MAGNETIC MEMORY ELEMENT

The present invention relates to a method for manufacturing integrated magnetic memory elements.

The known method of manufacture have the drawback of requiring vaporization in vacuo and several photoengraving operations and, consequently, the cost of manufacture of the memories is high.

The method according to the invention starts from a metal substrate and makes it possible to avoid any vaporization in vacuo, and to reduce the number of photoengraving operations.

The method according to the invention is of the type comprising a first series of steps for providing a magnetic circuit which is embedded in a metal layer on which the conductor or conductors are deposited, and a second series of steps in the course of which said metal layer is eliminated and substituted by an insulating material, the method according to the invention differing from the known methods by the first series of steps.

According to the invention, the method comprises:

Deposition by electrolysis on one face of a plate of metal forming a substrate attackable by chemical agents, through a mask, of the magnetic circuit of the element and etching from the other face of said substrate, in order to form *n* apertures through said substrate and inside said magnetic circuit, *n* being a positive integer and each of said apertures being designed to let through a conductor of the element; deposition by electrolysis, on the two faces of the assembly thus obtained and on the walls of said apertures, of a layer of said metal; deposition by electrolysis of *n* conductors on the two faces of the assembly and on the walls of said *n* apertures; elimination of the metal of said plate and of said layer and substitution therefor of an insulating material.

The invention will be better understood from a consideration of the ensuing description and with reference to the appended drawings in which.

It should be understood that the method described herein for one element will generally be applied for the simultaneous manufacturing of a great number of elements, for example, a thousand, starting from the same substrate.

By way of example, the substrate is a plate of copper having a thickness of the order of 20 microns.

Figure 1:
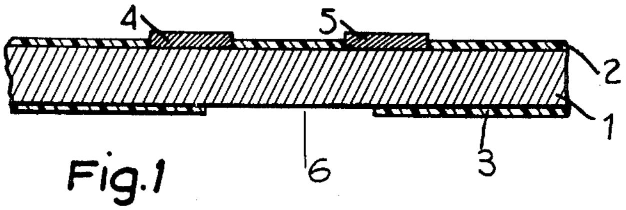
FIG. 1 shows in longitudinal cross section the substrate after the deposition of the magnetic material thereon.

In FIG. 1, this copper plate 1 has been covered with two layers of photoresist 2 and 3, deposited respectively upon the two faces of the plate.

The layer 2 is exposed through a mask having the pattern of the magnetic circuit of the element. The exposed part is dissolved and the copper is bared at zones 4 and 5 of the element; the overall dimensions of the element are of the order of 100 to 200 microns. A mask is also placed over layer 3, the mask having a number of apertures 6 within a region circumscribed by bared copper zones 4, 5 and equal to the number of conductors associated with the element. Only one such aperture is shown in the drawing. By dissolving the photoresist, the copper in the zones 6 is bared.

The copper plate is then placed upon an insulating support, for example a glass sheet (not shown) on which layer 3 rests.

Magnetic metal is then deposited by electrolysis upon the copper substrate at 4 and 5. Since it is protected by the support, the copper remains bare in the zones 6.

Figure 2:
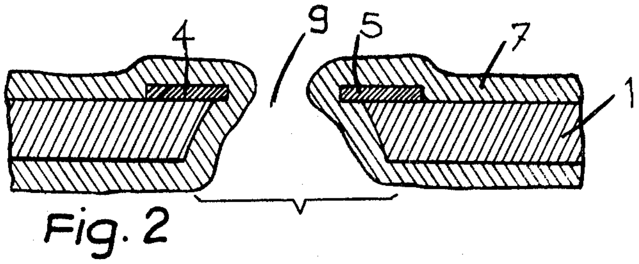
FIG. 2 shows in longitudinal cross section the substrate, after acid etching and the deposition, by electrolysis, of a new layer of the metal of which the substrate is made.

FIG. 2 shows the arrangement after etching has been carried out from the bared portion of the face on which the layer 3 is deposited.

This etching is a selective operation, the copper is dissolved, but the magnetic metal is not. In each zone 6, an opening 9 has been formed in the plate 1, inside the magnetic circuit shown at 4 and 5.

The layers 2 and 3 are then dissolved and a new layer 7 of copper is deposited upon the element by electrolysis.

This layer envelopes the element and, in particular, the magnetic circuit 4–5.

Figure 3:
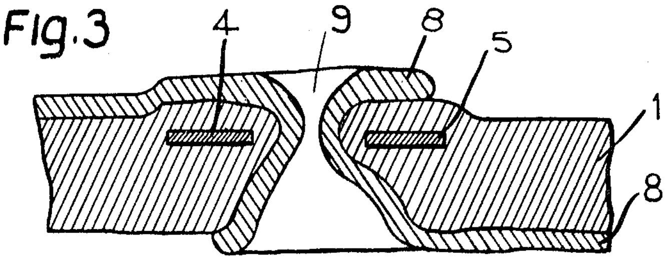
FIG. 3 illustrates in longitudinal cross section the substrate, after the deposition upon said material of a conductor element of the memory element.

In FIG. 3, conductor elements 8 made of gold, have been deposited by electrolysis, to be used for writing in and reading out the information which the memory element is intended to store. To this end, a layer of photoresist and an appropriate mask have again been used on either face of the element, and the corresponding portion of the metal layer bared through exposure. The conductor 8 forms an eyelet around the wall of the corresponding opening 9 and thus extends from one face to the other of the plate 1.

The following steps, known per se, have for their object to dissolve the copper in order to insulate the conductors, while maintaining the rigidity of the structure. To this end, the element is embedded in photoresist. Through a photoengraving process, by means of a chemical agent attacking the copper without attacking either the magnetic material (for example ferro-nickel), or the conductor material, in the present example gold, cavities are formed between the gold and the ferro-nickel in the vicinity of the eyelets. The insulating material is injected into these cavities so as to form studs 15.

Figure 4:
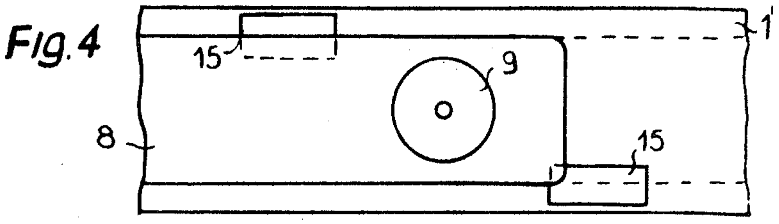
FIGS. 4 and 5 illustrate the element at the end of the manufacturing process, respectively in a top view and in longitudinal cross section.
Figure 5:
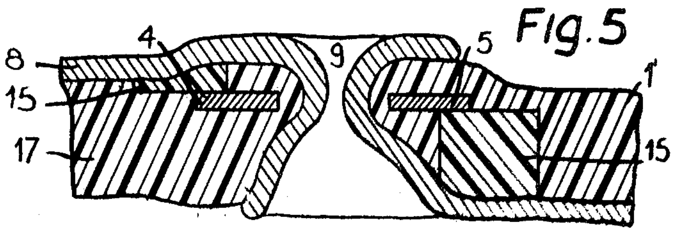

The arrangement thus obtained in the case of a single aperture and conductor, is shown in the top view of FIG. 4 and in longitudinal cross section in FIG. 5.

Finally, the rest of the copper is removed by a further selective chemical attack and replaced by an insulating layer 1′ which penetrates by capillary action between the ferro-nickel and the conductors.

Of course, the invention is not limited to the embodiments described and shown which were given solely by way of example.

What is claimed, is:

1. A method of manufacturing an integral magnetic memory element comprising the steps of
   1. providing a substrate of a metal soluble by a chemical agent,
      a. the metal substrate having two opposite faces;
   2. depositing, through a mask and by electrolysis, a magnetic circuit on one of the faces of the substrate,
      a. the magnetic circuit circumscribing a region of the element;
   3. etching the metal from the opposite face of the element to form *n* apertures through the substrate and within said region,
      a. *n* being a positive integer;
   4. depositing by electrolysis a layer of said metal on the two faces of the element and on the walls of the apertures to embed the magnetic circuit within the metal;
   5. depositing by electrolysis *n* conductors on the two faces of the element and on the walls of the *n* apertures;
   6. dissolving the metal of the substrate and the layer by the chemical agent, and removing the dissolved metal; and
   7. substituting an insulating material for the removed metal.

* * * * *